US009709150B2

(12) United States Patent
Fox

(10) Patent No.: US 9,709,150 B2
(45) Date of Patent: Jul. 18, 2017

(54) DIFFERENTIAL HAVING PISTON HOUSING INTEGRATED WITH DIFFERENTIAL CASE

(71) Applicant: Eaton Corporation, Cleveland, OH (US)

(72) Inventor: Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 199 days.

(21) Appl. No.: 14/585,672

(22) Filed: Dec. 30, 2014

(65) Prior Publication Data

US 2015/0111684 A1 Apr. 23, 2015

Related U.S. Application Data

(63) Continuation of application No. 14/049,461, filed on Oct. 9, 2013, now Pat. No. 8,951,155.

(60) Provisional application No. 61/712,239, filed on Oct. 10, 2012, provisional application No. 61/843,531, filed on Jul. 8, 2013, provisional application No. 61/878,302, filed on Sep. 16, 2013.

(51) Int. Cl.
| F16H 48/08 | (2006.01) |
| F16H 48/22 | (2006.01) |
| F16H 48/40 | (2012.01) |
| F16H 48/32 | (2012.01) |
| F16H 48/27 | (2012.01) |

(52) U.S. Cl.
CPC .............. *F16H 48/40* (2013.01); *F16H 48/22* (2013.01); *F16H 48/27* (2013.01); *F16H 48/32* (2013.01); *F16H 48/08* (2013.01)

(58) Field of Classification Search
CPC ........... F16H 48/08; F16H 48/22; F16H 48/40
See application file for complete search history.

(56) References Cited

U.S. PATENT DOCUMENTS

| 4,095,675 | A | * | 6/1978 | Bell | F16H 3/64 184/6.12 |
| 4,618,022 | A | * | 10/1986 | Hayashi | B60K 17/3462 180/233 |
| 5,133,696 | A | * | 7/1992 | Kobayashi | B60K 23/04 192/106 F |
| 5,839,327 | A | | 11/1998 | Gage | |
| 6,063,000 | A | * | 5/2000 | Sugimoto | F16H 48/08 475/231 |
| 6,503,167 | B1 | * | 1/2003 | Sturm | F16H 48/22 192/84.6 |
| 6,692,396 | B1 | | 2/2004 | Grogg | |
| 6,733,411 | B1 | | 5/2004 | Kaplan | |
| 6,902,506 | B2 | | 6/2005 | Schrand | |

(Continued)

*Primary Examiner* — Tisha Lewis
(74) *Attorney, Agent, or Firm* — Remarck Law Group PLC

(57) ABSTRACT

A differential gear includes a differential casing having a first differential case portion that defines a first output shaft opening and a second differential case portion that defines a second output shaft opening. The first differential case portion can include an annular pocket formed thereon and defined by an outer circumferential wall, an inner circumferential wall and an end wall. A piston can be slidably disposed in the annular pocket and configured to actuate a clutch assembly. A first and a second side gear can be rotatably mounted within the differential casing. The first and second side gears can be co-axially aligned along an axis of rotation of the differential casing.

19 Claims, 6 Drawing Sheets

(56) References Cited

U.S. PATENT DOCUMENTS

| | | |
|---|---|---|
| 7,318,511 B2 | 1/2008 | Grogg |
| 7,341,136 B2 | 3/2008 | Park |
| 7,353,927 B2 | 4/2008 | Park |
| 7,448,482 B2 | 11/2008 | Park |
| 8,167,763 B2 * | 5/2012 | Curtis .................... F16H 48/08 475/231 |
| 8,216,106 B2 * | 7/2012 | Curtis .................... F16H 48/08 475/235 |

* cited by examiner

DIFFERENTIAL HAVING PISTON HOUSING INTEGRATED WITH DIFFERENTIAL CASE

CROSS-REFERENCE TO RELATED APPLICATIONS

This application is a continuation of U.S. patent application Ser. No. 14/049,461 filed on Oct. 9, 2013, which claims the benefit of U.S. Provisional Application No. 61/712,239 which was filed on Oct. 10, 2012, U.S. Provisional Application No. 61/843,531, which was filed on Jul. 8, 2013, and U.S. Provisional Application No. 61/878,302 which was filed on Sep. 16, 2013. The disclosures of each of the above applications are incorporated herein by reference in their entirety.

FIELD

The present disclosure relates generally to differential gear mechanisms and more particularly to a differential case having an integrated piston housing.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential casing having a first differential case portion that defines a first output shaft opening and a second differential case portion that defines a second output shaft opening. The first differential case portion can include an annular pocket formed thereon and defined by an outer circumferential wall, an inner circumferential wall and an end wall. A piston can be slidably disposed in the annular pocket and configured to actuate a clutch assembly. A first and a second side gear can be rotatably mounted within the differential casing. The first and second side gears can be co-axially aligned along an axis of rotation of the differential casing. The first side gear can define a first shaft opening configured to provide a first torque transmitting connection with a first output shaft received within the first output shaft opening. The second side gear can define a second shaft opening configured to provide a second torque transmitting connection with a second output shaft received within the second output shaft opening.

According to additional features the differential gear mechanism can further comprise a reaction block disposed on the first differential case portion. The reaction block can be configured to transfer a first side gear separation force onto the first differential case portion. The first differential case can further include an annular lip formed in part by the inner circumferential wall. The reaction block can be disposed on the annular lip.

According to still other features the reaction block can include a radial arm and a ledge. The ledge can rest against the annular lip of the reaction block. The radial arm opposes the inner circumferential wall of the annular pocket of the first differential case. The first side gear defines an annular channel that nestingly receives the reaction block therein. The reaction block can define a plurality of bores therethrough. The reaction block can be conical.

According to other features the first differential case can define a plurality of blind bores that receive planet gear shafts from a planetary gear set. The differential assembly can further include a first o-ring disposed between the piston and the outer circumferential wall of the annular pocket. A second o-ring can be disposed between the piston and the inner circumferential wall of the annular pocket. A washer can be disposed between the reaction block and the first side gear.

A differential gear mechanism constructed in accordance to another example of the present disclosure can include a differential casing having a first differential case portion that defines a first output shaft opening and a second differential case portion that defines a second output shaft opening. The first differential case portion can include an annular pocket formed thereon. A piston can be slidably disposed in the annular pocket and configured to actuate a clutch assembly. A first and a second side gear can be rotatably mounted within the differential casing. The first and second side gears can be co-axially aligned along an axis of rotation of the differential casing. The first side gear can define a first shaft opening configured to provide a first torque transmitting connection with a first output shaft received within the first output shaft opening. The second side gear can define a second shaft opening configured to provide a second torque transmitting connection with a second output shaft received within the second output shaft opening. A reaction block can be disposed on the first differential case portion. The reaction block can be configured to transfer a first side gear separation force onto the first differential case portion.

According to additional features, the annular pocket can be defined by an outer circumferential wall, an inner circumferential wall and an end wall. The first differential case can further include an annular lip formed in part by the inner circumferential wall. The reaction block can be disposed on the annular lip. The reaction block can include a radial arm and a ledge. The ledge can rest against the annular lip of the reaction block. The radial arm can oppose the inner circumferential wall of the annular pocket of the first differential case.

According to other features, the first side gear defines an annular channel that nestingly receives the reaction block therein. The first differential case can define a plurality of blind bores that receive planet gear shafts from a planetary gear set. The differential assembly can further include a first o-ring disposed between the piston and the outer circumferential wall of the annular pocket. A second o-ring can be disposed between the piston and the inner circumferential wall of the annular pocket.

A differential gear mechanism constructed in accordance to another example of the present disclosure can include a differential casing having a first differential case portion that defines a first output shaft opening and a second differential case portion that defines a second output shaft opening. The first differential case portion can include an annular pocket formed thereon. The first differential case can further define a plurality of blind bores that receive planet gear shafts from a planetary gear set. A piston can be slidably disposed in the annular pocket and configured to actuate a clutch assembly. A first and a second side gear can be rotatably mounted within the differential casing. The first and second side gears can be co-axially aligned along an axis of rotation of the differential casing. The first side gear can define a first shaft opening configured to provide a first torque transmitting connection with a first output shaft received within the first output shaft opening. The second side gear can define a second shaft opening configured to provide a second torque transmitting connection with a second output shaft received within the second output shaft opening. A reaction block can be disposed on the first differential case portion. The reaction block can be configured to transfer a first side gear separation force onto the first differential case portion.

According to other features, the reaction block can include a radial arm and a ledge. The ledge can rest against the annular lip of the reaction block. The radial arm can oppose the inner circumferential wall of the annular pocket of the first differential case.

BRIEF DESCRIPTION OF THE DRAWINGS

The present disclosure will become more fully understood from the detailed description and the accompanying drawings, wherein.

DETAILED DESCRIPTION

Figure 1:
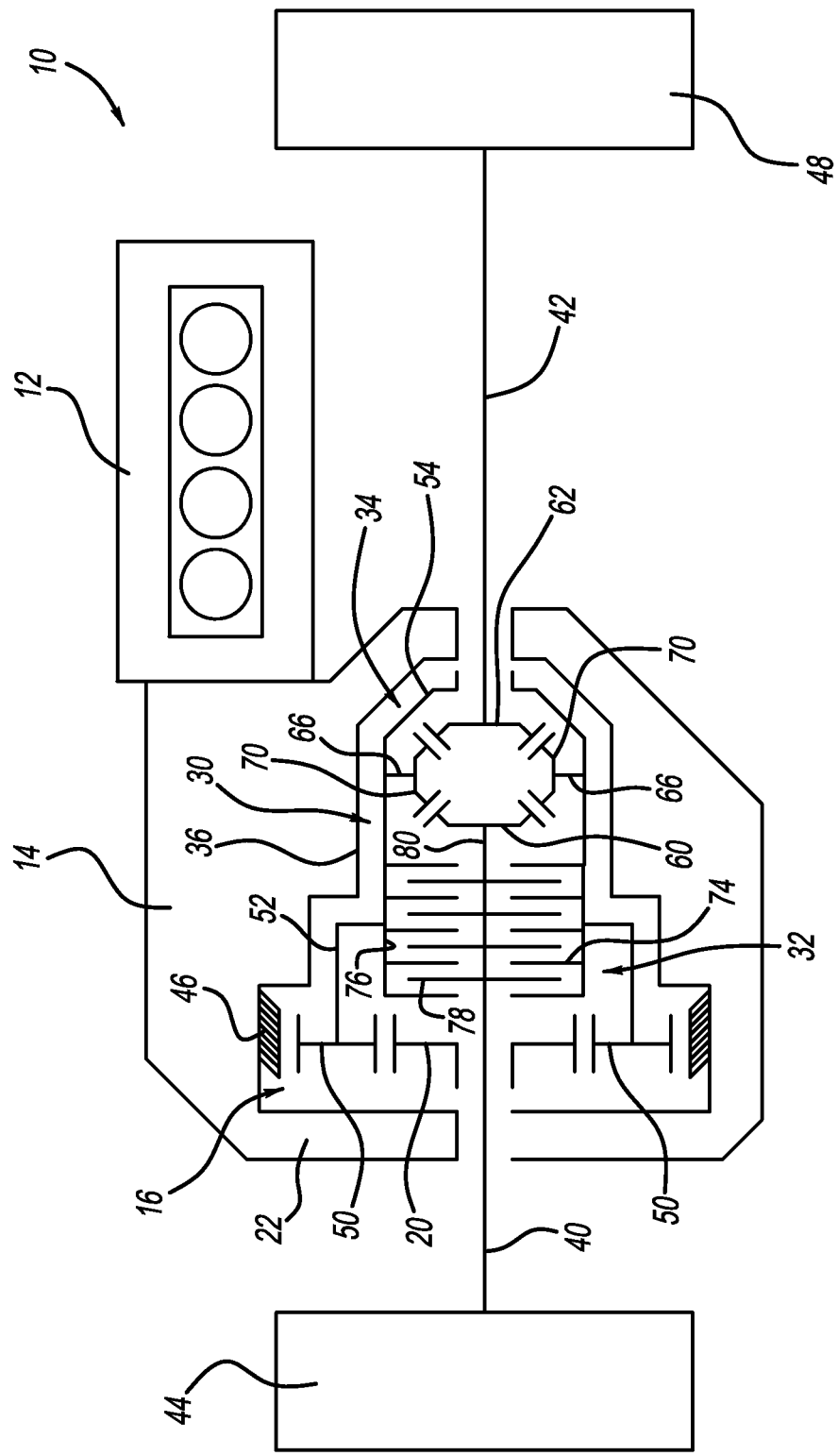
FIG. 1 is schematic of an exemplary vehicle driveline incorporating a differential gear mechanism constructed in accordance to one example of the present disclosure.

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a transaxle 22 and a limited slip differential assembly 30 having a planetary gear assembly 16, a clutch assembly 32 and a differential gear assembly 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

Figure 3:
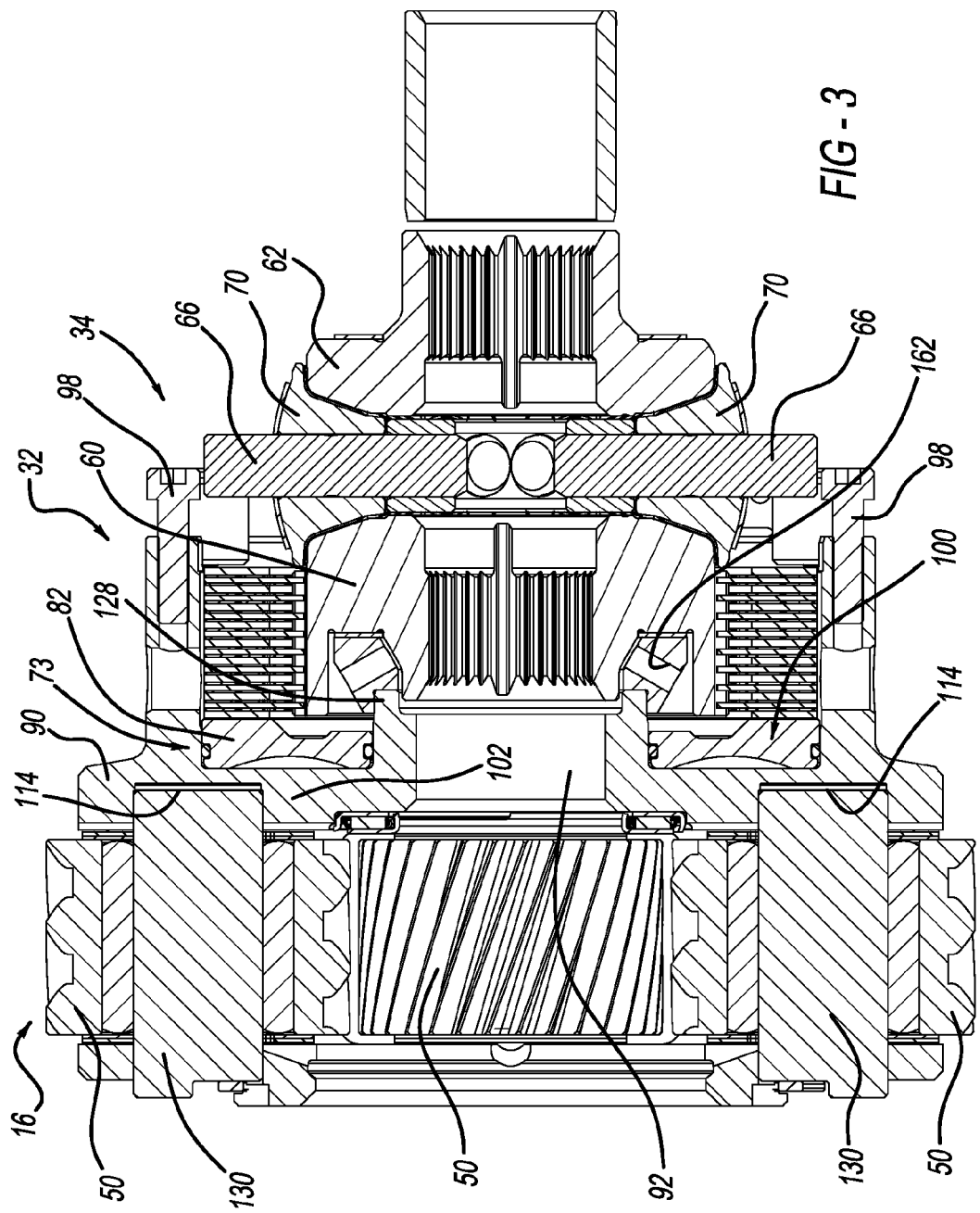
FIG. 3 is a cross-sectional view of the limited slip differential assembly taken along lines 3-3 of FIG. 2.
Figure 4:
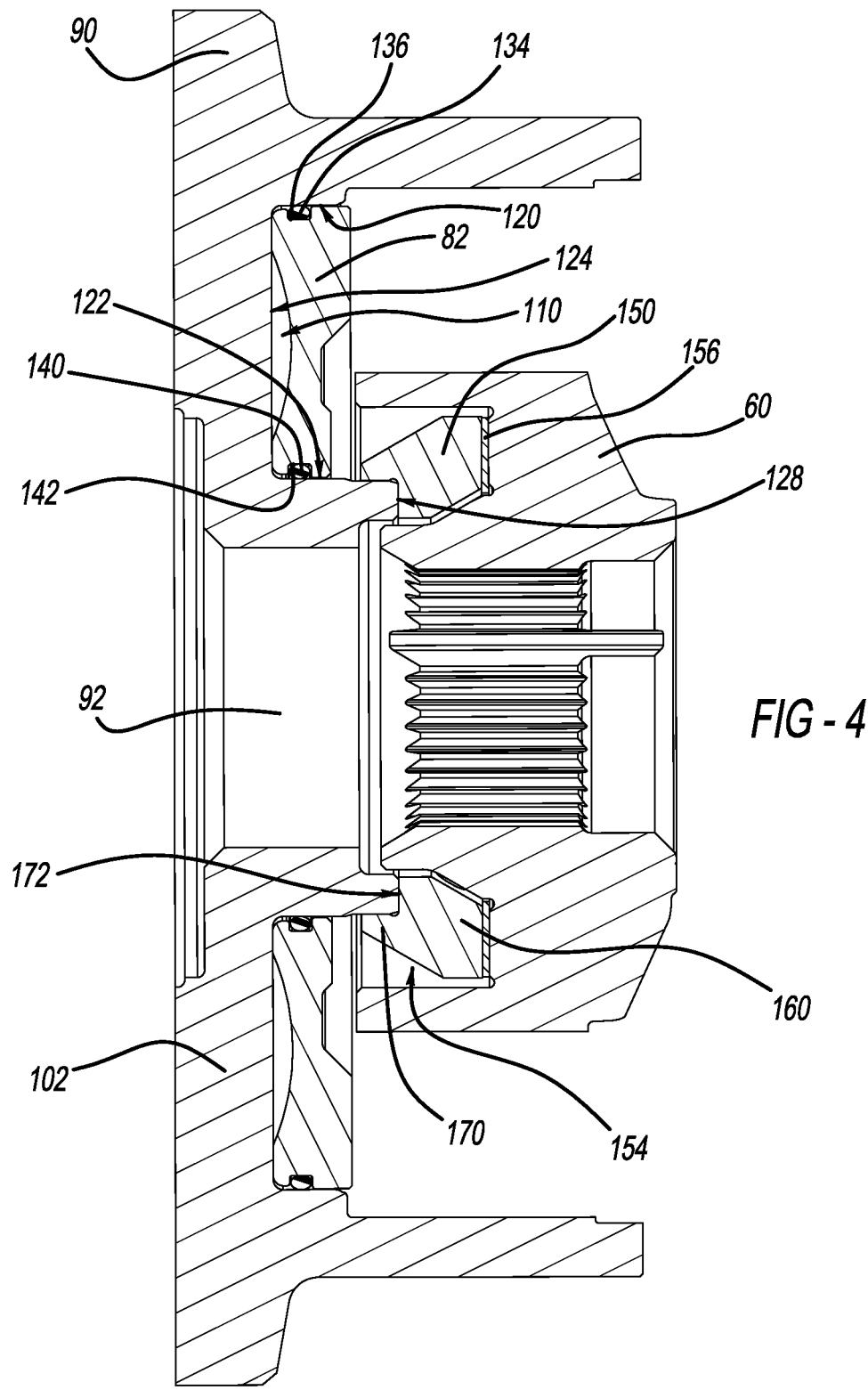
FIG. 4 is a detailed sectional view of a first differential case, piston, reaction block and side gear of FIG. 3.
Figure 5:
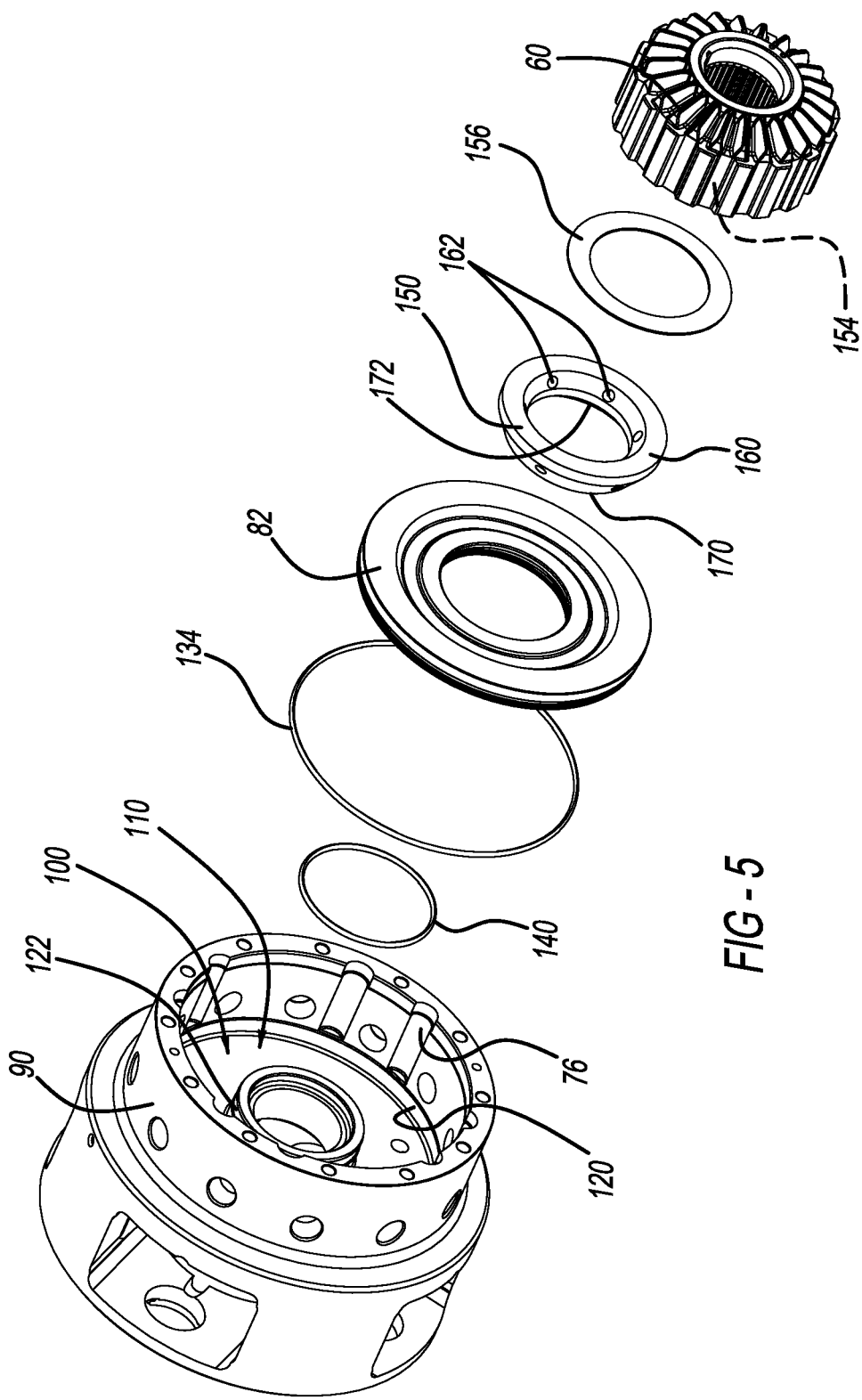
FIG. 5 is a front exploded perspective view of a portion of the differential case of FIG. 2.
Figure 6:
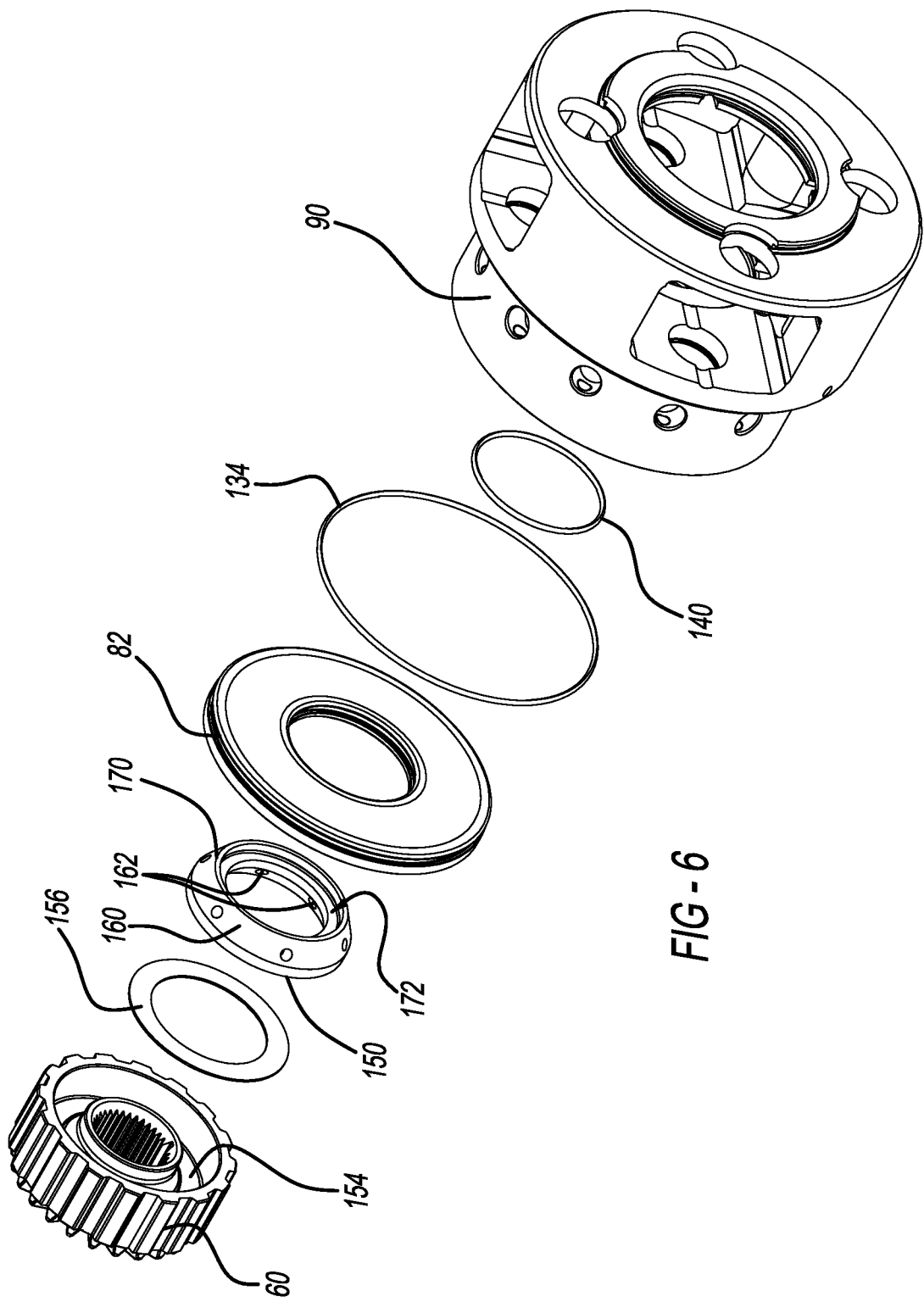
FIG. 6 is a rear exploded perspective view of a portion of the differential case shown in FIG. 5.

The differential gear assembly 34 includes a pair of side gears 60 and 62 that are mounted for rotation with the axle shafts 40 and 42 (and first and second drive wheels 44 and 48), respectively. The side gears 60 and 62 define first and second axle shaft openings 64 and 65 (FIG. 3). A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack 72 and a clutch actuator 73. The clutch pack 72 includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid that can act on a piston 82 to selectively actuate the clutch pack 72 between the open, closed and partially closed configurations.

Figure 2:
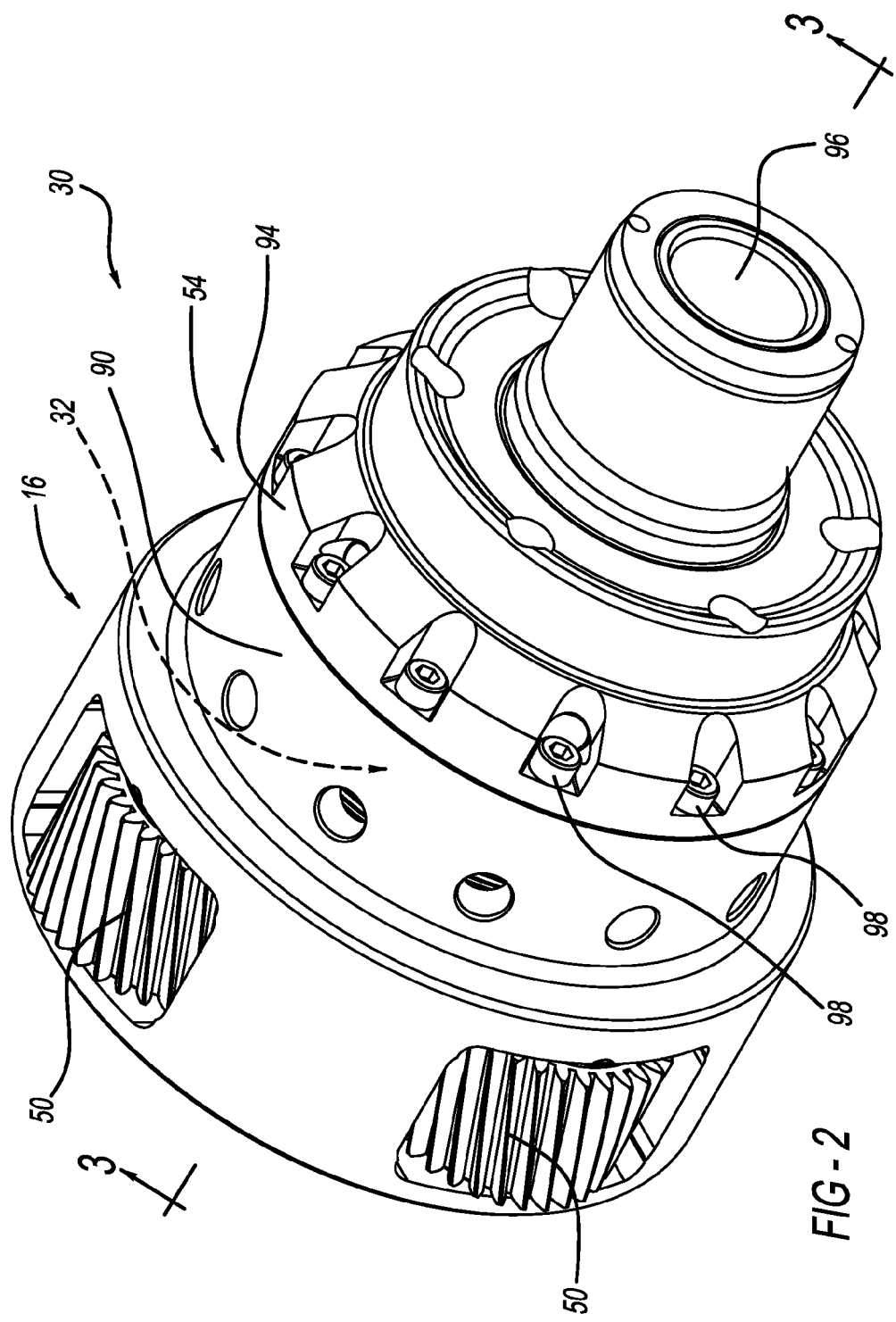
FIG. 2 is a front perspective view of a limited slip differential assembly constructed in accordance to one example of the present disclosure.

With additional reference now to FIGS. 2-6, additional features of the differential gear assembly 34 will be described. The differential case 54 can include a first differential case portion 90 that defines a first output shaft opening 92 (FIG. 3) and a second differential case portion 94 that defines a second output shaft opening 96 (FIG. 2). The first and second differential case portions 90 and 94 can be coupled together by a plurality of fasteners 98. In the example shown, the fasteners include hex bolts although other configurations are contemplated. As will become appreciated from the following discussion, the first differential case portion 90 can include define an integrally formed piston housing 100. Further, the first differential case portion 90 can share a common wall 102 (FIG. 3) between the planetary gear assembly 16 and the piston housing 100.

The first differential case portion 90 can define an annular pocket 110 (FIG. 4) and a plurality of blind bores 114 (FIG. 3). The annular pocket 110 can be defined by an outer circumferential wall 120, an inner circumferential wall 122 and an end wall 124. The end wall 124 can be integral to the common wall 102. The first differential case 90 can further include an annular lip 128 formed in part by the inner circumferential wall 122. The blind bores 114 can be receive planet gear shafts 130 that support the planet gears 50 of the planetary gear assembly 16.

A first o-ring 134 can disposed between the piston 82 and the outer circumferential wall 120 of the annular pocket 110. In one example, the piston 82 can define an outer annular recess 136. The first o-ring 134 can nest in the outer annular recess 136. A second o-ring 140 can be disposed between the piston 82 and the inner circumferential wall 122 of the annular pocket 110. In one example, the piston 82 can define an inner annular recess 142. The second o-ring 140 can nest in the inner annular recess 142.

During operation of the clutch assembly 32, the piston 82 can be caused to actuate toward and away (in a horizontal direction as viewed in FIG. 3) from the clutch pack 72 in the annular pocket 110. Actuation of the piston 82 can be caused by a predetermined amount of hydraulic pressure delivered to the clutch assembly 32 generating the optimum bias ratio for the situation to maintain the proper kinematic wheel speed difference as if both wheels were gripping predictably. In the example shown, actuation of the piston 82 toward an engaged position (rightward as viewed in FIG. 3) causes the annular plates 74 and the annular friction disks 78 to become frictionally engaged thereby locking the differential gear assembly 34 such that the side gears 60 and 62 rotate at the same speed.

A reaction block 150 can be disposed on the first differential case portion 190. The reaction block 150 can be configured to transfer a separation force from the first side gear 60 onto the first differential case portion 90. In this regard, the reaction block 150 and the first differential case portion 90 can provide structural support for maintaining an axial position of the side gear 60. The reaction block 150 can be nestingly received in an annular channel 154 (FIGS. 4 and 6) defined in the first side gear 60. A washer 156 can be disposed in the annular channel 154 between the side gear 60 and the reaction block 150. The reaction block 150 can generally include a conical body 160 that defines a plurality of bores 162 therethrough. The reaction block 150 can include a radial arm 170 (FIG. 4) and a ledge 172. The ledge 172 rests against the annular lip 128 of the first differential case portion 90. The radial arm 170 opposes the inner circumferential wall 122 of the annular pocket 110.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential gear mechanism comprising:
   a differential casing having a first differential case portion that defines a first output shaft opening and a second differential case portion that defines a second output shaft opening, the first differential case portion including an annular pocket formed thereon and defined by an outer circumferential wall, an inner circumferential wall and an end wall;
   a piston slidably disposed in the annular pocket and configured to actuate a clutch assembly;
   a first and a second side gear rotatably mounted within the differential casing, the first and second side gears being co-axially aligned along an axis of rotation of the differential casing; and
   a reaction block disposed on the first differential case portion and configured to transfer a first side gear separation force onto the first differential case portion.

2. The differential gear mechanism of claim 1 wherein the first differential case further includes an annular lip formed in part by the inner circumferential wall.

3. The differential gear mechanism of claim 2 wherein the reaction block is disposed on the annular lip.

4. The differential gear mechanism of claim 3 wherein the reaction block includes a radial arm and a ledge, wherein the ledge rests against the annular lip of the reaction block and the radial arm opposes the inner circumferential wall of the annular pocket of the first differential case.

5. The differential gear mechanism of claim 1 wherein the first side gear defines an annular channel that nestingly receives the reaction block therein.

6. The differential gear mechanism of claim 1 wherein the reaction block defines a plurality of bores therethrough.

7. The differential gear mechanism of claim 1 wherein the reaction block is conical.

8. The differential gear mechanism of claim 1 wherein the first differential case portion defines a plurality of blind bores that receive planet gear shafts from a planetary gear set.

9. The differential assembly of claim 1 further comprising:
a first o-ring disposed between the piston and the outer circumferential wall of the annular pocket; and
a second o-ring disposed between the piston and the inner circumferential wall of the annular pocket.

10. The differential assembly of claim 1, further comprising:
a washer disposed between the reaction block and the first side gear.

11. A differential gear mechanism comprising:
a differential casing having a first differential case portion that defines a first output shaft opening and a second differential case portion that defines a second output shaft opening, the first differential case portion including an annular pocket formed thereon;
a piston slidably disposed in the annular pocket and configured to actuate a clutch assembly;
a first and a second side gear rotatably mounted within the differential casing, the first and second side gears being co-axially aligned along an axis of rotation of the differential casing, the first side gear defining a first shaft opening configured to provide a first torque transmitting connection with a first output shaft received within the first output shaft opening, the second side gear defining a second shaft opening configured to provide a second torque transmitting connection with a second output shaft received within the second output shaft opening; and
a reaction block disposed on the first differential case portion and configured to transfer a first side gear separation force onto the first differential case portion.

12. The differential gear mechanism of claim 11 wherein the annular pocket is defined by an outer circumferential wall, an inner circumferential wall and an end wall.

13. The differential gear mechanism of claim 12 wherein the first differential case portion further includes an annular lip formed in part by the inner circumferential wall and wherein the reaction block is disposed on the annular lip.

14. The differential gear mechanism of claim 13 wherein the reaction block includes a radial arm and a ledge, wherein the ledge rests against the annular lip of the reaction block and the radial arm opposes the inner circumferential wall of the annular pocket of the first differential case portion.

15. The differential gear mechanism of claim 11 wherein the first side gear defines an annular channel that nestingly receives the reaction block therein.

16. The differential gear mechanism of claim 11 wherein the first differential case portion defines a plurality of blind bores that receive planet gear shafts from a planetary gear set.

17. The differential assembly of claim 11 further comprising:
a first o-ring disposed between the piston and the outer circumferential wall of the annular pocket; and
a second o-ring disposed between the piston and the inner circumferential wall of the annular pocket.

18. A differential gear mechanism comprising:
a differential casing having a first differential case portion that defines a first output shaft opening and a second differential case portion that defines a second output shaft opening, the first differential case portion including an annular pocket formed thereon, wherein the first differential case portion further defines a plurality of blind bores that receive planet gear shafts from a planetary gear set;
a piston slidably disposed in the annular pocket and configured to actuate a clutch assembly;
a first and a second side gear rotatably mounted within the differential casing, the first and second side gears being co-axially aligned along an axis of rotation of the differential casing, the first side gear defining a first shaft opening configured to provide a first torque transmitting connection with a first output shaft received within the first output shaft opening, the second side gear defining a second shaft opening configured to provide a second torque transmitting connection with a second output shaft received within the second output shaft opening; and
a reaction block disposed on the first differential case portion and configured to transfer a first side gear separation force onto the first differential case portion.

19. The differential gear mechanism of claim 18 wherein the reaction block includes a radial arm and a ledge, wherein the ledge rests against the annular lip of the reaction block and the radial arm opposes the inner circumferential wall of the annular pocket of the first differential case portion.

* * * * *